(12) United States Patent
Zhang et al.

(10) Patent No.: US 8,849,798 B2
(45) Date of Patent: Sep. 30, 2014

(54) SAMPLING ANALYSIS OF SEARCH QUERIES

(75) Inventors: Junlin Zhang, Hangzhou (CN); Jian Sun, Beijing (CN); Lei Hou, Hangzhou (CN); Qin Zhang, Hangzhou (CN)

(73) Assignee: Alibaba Group Holding Limited (KY)

( * ) Notice: Subject to any disclaimer, the term of this patent is extended or adjusted under 35 U.S.C. 154(b) by 340 days.

(21) Appl. No.: 12/657,431

(22) Filed: Jan. 20, 2010

(65) Prior Publication Data

US 2010/0185619 A1    Jul. 22, 2010

(30) Foreign Application Priority Data

Jan. 22, 2009   (CN) .......................... 2009 1 0001117

(51) Int. Cl.
*G06F 17/30* (2006.01)

(52) U.S. Cl.
CPC ................. *G06F 17/30861* (2013.01)
USPC .......................... 707/721; 707/737; 702/179

(58) Field of Classification Search
CPC .......... G06F 17/30536; G06F 11/3476; G06F 11/3466; G06F 17/18
See application file for complete search history.

(56) References Cited

U.S. PATENT DOCUMENTS

| | | | | |
|---|---|---|---|---|
| 6,006,225 | A * | 12/1999 | Bowman et al. ...................... | 1/1 |
| 6,119,114 | A | 9/2000 | Smadja | |
| 6,578,032 | B1 * | 6/2003 | Chandrasekar et al. .............. | 1/1 |
| 6,691,099 | B1 * | 2/2004 | Mozes ................... | 1/1 |
| 7,062,485 | B1 | 6/2006 | Jin et al. | |
| 7,197,497 | B2 | 3/2007 | Cossock | |
| 7,340,460 | B1 * | 3/2008 | Kapur et al. ......................... | 1/1 |
| 2002/0184212 | A1 * | 12/2002 | Ugai et al. ........................ | 707/6 |
| 2004/0044571 | A1 | 3/2004 | Bronnimann et al. | |
| 2004/0199498 | A1 * | 10/2004 | Kapur et al. ....................... | 707/3 |
| 2005/0080795 | A1 | 4/2005 | Kapur et al. | |
| 2005/0197829 | A1 * | 9/2005 | Okumura ........................ | 704/10 |
| 2008/0010144 | A1 | 1/2008 | Chatwin et al. | |
| 2008/0052152 | A1 | 2/2008 | Yufik | |
| 2008/0249855 | A1 | 10/2008 | Collins et al. | |
| 2008/0301117 | A1 * | 12/2008 | Zeng et al. ........................ | 707/5 |
| 2008/0313164 | A1 | 12/2008 | Lee et al. | |

(Continued)

FOREIGN PATENT DOCUMENTS

| | | |
|---|---|---|
| CN | 200510007089.5 | 2/2005 |
| CN | 200610024726.4 | 3/2006 |
| CN | 200710177074.2 | 11/2007 |
| JP | 2004206517 | 7/2004 |

OTHER PUBLICATIONS

"Querying Structured Text in an XML Database," by Al-Khalifa et al. In: SIGMOD 2003, Jun. 9-12, 2003. Available at: ACM.*

(Continued)

*Primary Examiner* — Daniel Kinsaul
(74) *Attorney, Agent, or Firm* — Van Pelt, Yi & James LLP (57) ABSTRACT

Sampling analysis includes classifying a plurality of query keywords into a plurality of query keyword subsets according to page view (PV) values associated with the plurality of query keywords, the plurality of query keywords being submitted by a plurality of users; determining a respective plurality of sample rates of a respective plurality of query keywords in a respective one of the plurality of query keyword subsets; and sampling query data in the respective one of the plurality of query keyword subsets according to the respective plurality of sample rates.

17 Claims, 6 Drawing Sheets

(56) References Cited

U.S. PATENT DOCUMENTS

| | | | |
|---|---|---|---|
| 2009/0002370 A1* | 1/2009 | Helfman | 345/440 |
| 2009/0248666 A1* | 10/2009 | Ahluwalia | 707/5 |
| 2010/0169300 A1* | 7/2010 | Liu et al. | 707/709 |
| 2011/0040733 A1* | 2/2011 | Sercinoglu et al. | 707/688 |

OTHER PUBLICATIONS

"Automatic Classification of Web Queries Using Very Large Unlabeled Query Logs," by Beitzel et al. In: ACM Transactions Information Systems (2007). Available at: ACM.*

"On Understanding and Classifying Web Queries," by Beitzel, Steven. In: (2006). Available at: http://www.webir.org/resources/phd/Beitzel_2006.pdf.*

"A Day in the Life of PubMed: Analysis of a Typical Day's Query Log," by Herskovic et al. In: J. Am. Med. Inform. Assoc. (2007). Available at: http://jamia.bmj.com/content/14/2/212.full.pdf+html.*

"Overcoming Limitations of Sampling for Aggregation Queries," by Chaudhuri et al. In: Proc. 17th Int'l Conf. on Data Engineering (2001). Available at: IEEE.*

"Sampling Search-Engine Results," by Anagnostopoulos et al. In: World Wide Web 9: 397-429 (2006). Available at: SpringerLink.*

You Rongyan, "Zipf's Law and Distribution of Chinese Character Frequency", Journal of Chinese Information Processing, 1999, vol. 14 No. 3.

* cited by examiner

SAMPLING ANALYSIS OF SEARCH QUERIES

CROSS REFERENCE TO OTHER APPLICATIONS

This application claims priority to People's Republic of China Patent Application No. 200910001117.0 entitled METHOD, SYSTEM AND DEVICE FOR SAMPLING ANALYSIS, filed Jan. 22, 2009, which is incorporated herein by reference for all purposes.

FIELD OF INVENTION

The present invention relates generally to the field of network technology and more particularly to method, system and device for sampling analysis.

BACKGROUND OF THE INVENTION

Search engines are typically configured to record user page views. For a large-scale search engine, in a certain period of time, user page views can include a huge amount of data and a high proportion of user query keywords are repeated queries. For example, if there is a recent news event, query keywords queried by different users are usually similar and even the same. Search engine service providers will typically process user page views in order to provide better service. One basic processing technique is to merge the same query keywords, which would reduce a large amount of memory or disk space occupied by data storage. For example, assuming that recently there have been 2000 queries with the query keyword of "Alibaba", and the resulting merged data form is "Alibaba 2000", where "Alibaba" stands for user query keywords, and "2000" stands for the number of appearances of the query keyword in query log in a period of time. How to sample query keywords for the preliminary processed statistic data to make sampled data close to the real distribution of query keywords, however, remains unsolved.

In existing systems, to perform statistical analysis for data in the format of "query keyword, Page Views (PV)", the system first calculates the proportion of each query keyword in all the query keywords. PV stands for the number of appearances of certain query keywords in the search platform. Taking the query data "Alibaba 2000" for example, the system first calculates the sum of PV values of all query keywords in the query keyword collection. Assuming that the sum of PV values is one million, which means that there are one million query keywords for all users in the system, and then calculating the proportion of the query keyword "Alibaba" in all query keywords and obtaining the proportion is 2000/1000000=0.0025, which means that the randomly sampled probability of the query keyword "Alibaba" in all query keywords is 0.0025. When sampled probabilities of all the query keywords are determined, a specific query keyword in the collection of all query keywords is sampled according to sampled probability of the query keyword. Based on the analysis of the final sampled data of corresponding query keywords, the distribution of user query keywords can be determined. For example, in a collection with a total number of one million PVs, 10000 PVs are selected as samples to be analyzed. The specific query keyword sampling, process is as follows: determine the sampled size of the query keyword according to its sampled probability, that is, [the sample size of the query keyword]=[the expected sample size]*[the sample probability of the query keyword], wherein the sample size of the query keyword and the expected sample size are positive integers. For example, assuming that the sample probability of the query keyword "Alibaba" is 0.0025, then 10000*0.0025=25 queries with keyword "Alibaba" are selected as query keyword samples. In the same way, the sample sizes of other query keywords are obtained according to the formula above; the sum of sample sizes of all query keywords is 10000. Compared with one million page views, the workload and calculation steps of analyzing and processing 10,000 sample page views for data analysts are much reduced and the efficiency is increased.

There are a number of problems with existing technology. For example, if the data size to be sampled is large, the sampling analysis method used in existing technology can simulate real data distribution to a certain extent. But when the data size to be sampled is on a medium or small scale, great distortion will be generated between the sampled result and the real distribution of data. This is because many statistic distributions of data have the characteristics of "long tail", i.e., a lot of entities or data with low frequencies of appearance. Specifically, when users use search engine to query keywords, there are many query keywords queried by users appearing only a few times, such as some query keywords appear once or twice. Although the appearing frequency of some query keywords are very low, the sum of the query keywords with low appearing frequency occupies a big proportion of the total size of query keywords. For the long tail distribution, if existing sampling analysis method is used, then low frequency query keywords are not effectively sampled. For example, a goal of an application is to sample 2000 query words with the sum of PV values is one million. For a query keyword, take "ecommerce 1" for example, its sampled probability is one per one million and such low-frequency query keywords cannot be sampled by the method above. Due to the great difference between the distribution of sampled data obtained by the existing sampling analysis method and the distribution of real data, user demand information and market trends are often not mastered by sampling analysis of query keywords in search engine, and online commerce is constrained.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
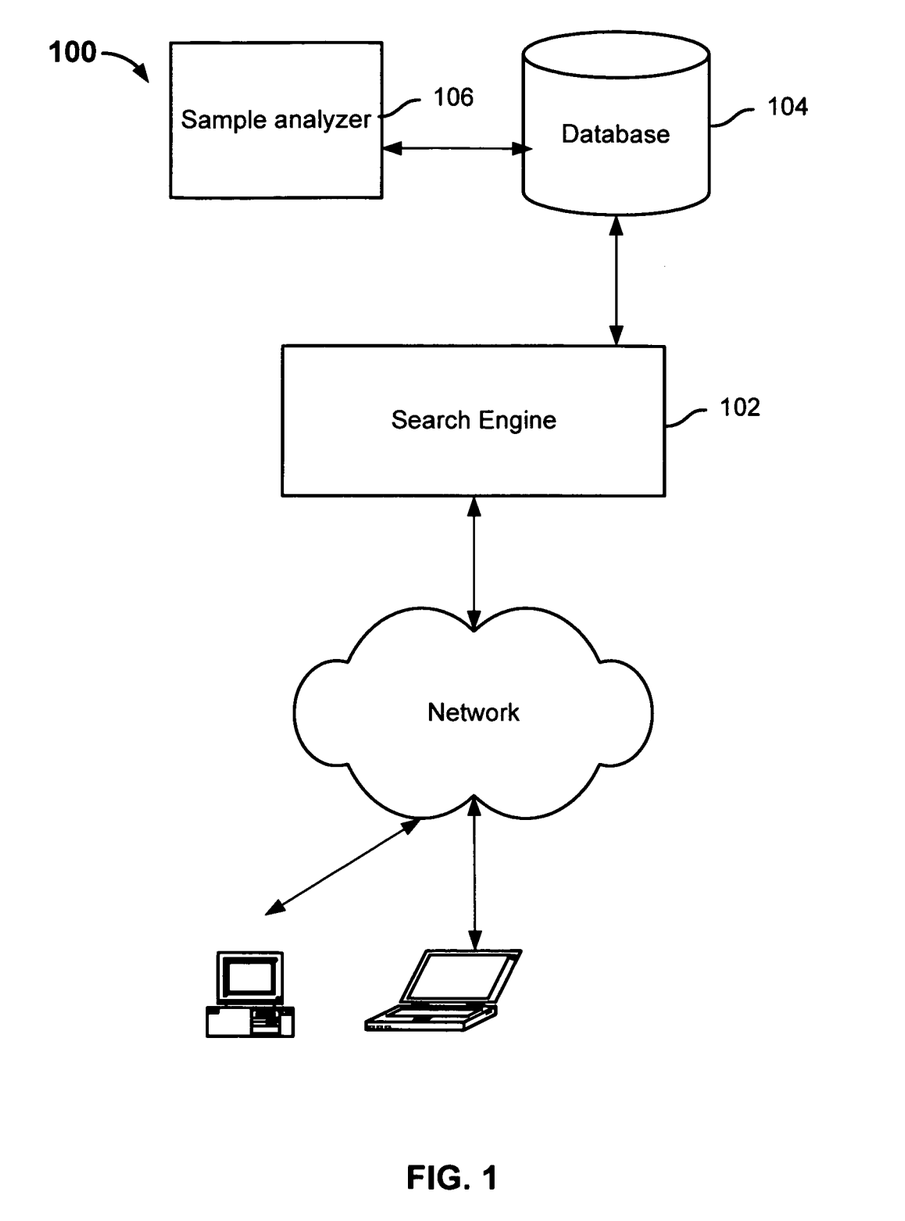
FIG. 1 is a block diagram illustrating an embodiment of a sampling analysis system.

FIG. 1 is a block diagram illustrating an embodiment of a sampling analysis system. System 100 includes a search platform, which includes a search engine 102 used for providing search service and a database 104 used for recording page view (PV) values of different query keywords sent by users of the search platform. Users access the search engine through a network and the page view values corresponding to the query keywords used by the users are recorded in the database. System 100 further includes a sample analyzer 106, which is used for analyzing the recorded query keywords. The sample analyzer may be implemented using one or more computing devices such as general purpose servers, special purpose devices, or other hardware/software/firmware combination that includes one or more processors, memory coupled to the processors, and configured to provide the processors with instructions. In some embodiments, portions or all the functions of the search engine, the database, and the sample analyzer are combined and implemented on one or more devices. As will be described in greater detail below, the analysis process performed by the sample analyzer in some embodiments includes: classifying the query keywords into one or more query keyword subset according to the PV values of different query keywords recorded by the search platform, calculating sampled size of the query keyword subset, and sampling query data in the query keyword subset according to the sampled size.

Figure 2:
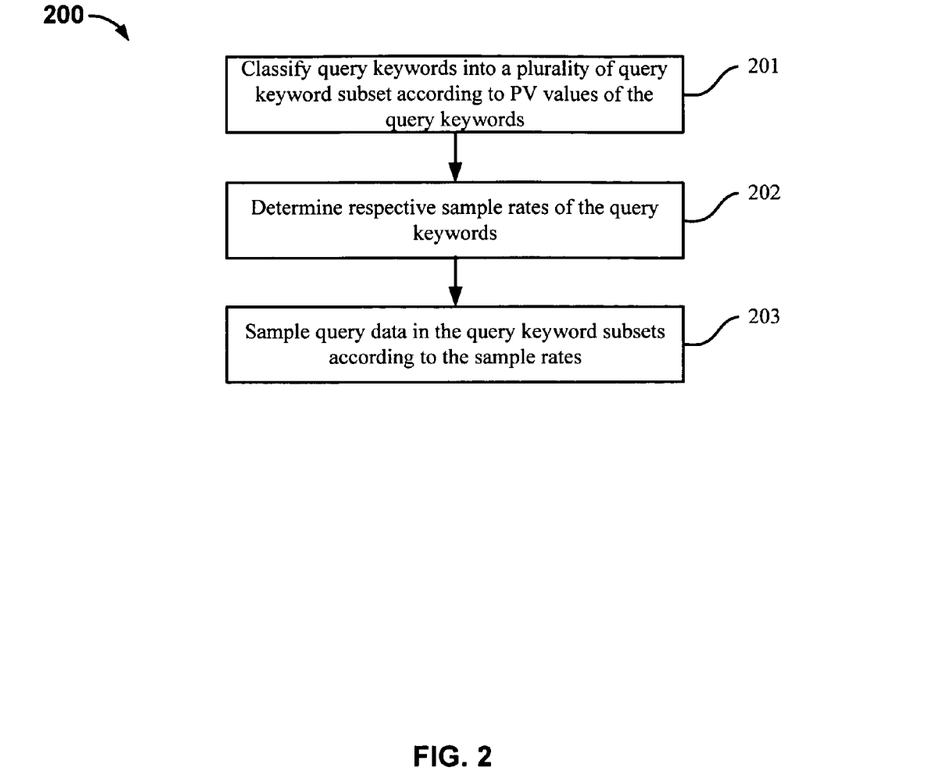
FIG. 2 is a flowchart illustrating an embodiment of a process for sampling analysis for large-scale search engine query data.

FIG. 2 is a flowchart illustrating an embodiment of a process for sampling analysis for large-scale search engine query data. Process 200 may be implemented on a system such as 100 of FIG. 1. At 201, query keywords are classified into one or more query keyword subsets according to PV values of different query keywords. As used herein, a PV value is the number of appearances of a query keyword in the search platform in a pre-set period of time. In some embodiments, before performing sampling analysis, the PV values of all user query keywords recorded by search engine in a period of time are recorded and the PV values of different query keywords are ordered. In various embodiments, the PV values may be ordered in ascending order (from small to large) or descending order (from large to small). The query keywords with the same PV value are classified as one query keyword subset. Thus, a query keyword subset may include a number of query keywords.

At 202, the respective sample rates of the query keywords in the corresponding query keyword subsets are determined. In various embodiments, the sample rate for a query keyword includes the sample probability, the sample size, or both. In some embodiments, before sampling query keywords from the collection of all query keywords, the system first determines query keyword size in the sampling analysis according to the demand of application. Specifically, the system first calculates the sum of PV values in each query keyword subset as SPV (Set Page View) value. SPV value refers to the total PV size for a specific query keyword subset. The system then sums the SPV value of each query keyword subset and obtains the total page view size of the query keyword collection, denoted as TPV value. The TPV value corresponds to the total number of all user query keywords appearing in the search platform during a pre-set period of time. Sample probability of the query keyword is calculated according to the ratio of the SPV value obtained and the TPV value. The sample size of a specific query keyword subset is then calculated according to the determined query keyword sample size and the sample probability of each query keyword subset.

At 203, query data in the query keyword subset is sampled according to the sample rate of the query keyword. In some embodiments, query data in the query keyword subset is randomly sampled by random drawing based on a randomly generated number. Other random selection techniques can be used. Randomly sampled query data of the query keyword subset is used to analyze distributions of different query keywords searched by users in a period of time, so that the information demanded by the user is understood and utilized by the system.

Using the technique described above, query data demanded by users is sampled from a large amount of preliminarily statistically processed query keyword collection. The technique can reduce the storage required for the subsequent calculation and solve the risk of underestimating low-frequency queries, which makes medium-size or small-size samples more closely resemble the actual distribution of real data and provides accurate user demand information and market trend to search engine service providers to increase quality.

For many search engine service providers, the aim to provide a function of "what are users searching for presently" is to output query request which users send to the search engine in real time. In a large-scale search engine, many users will use the results of this function to perform a query, and each user will typically search for multiple query keywords on the search platform. Thus, even in a very short period of time, user queries recorded by search engine can be a huge amount of data. On some search platforms, more than 100 million search requests are received per day. In the recorded user query keywords, a high proportion of user query keywords are repeated queries, that is, query keywords sent by different users that are similar or even the same. Taking a currently breaking news event for example, there may be hundreds of users sending the same query request to query the event in a short period of time. Search engine service providers need to process a massive number of user query requests in a certain period of time in order to provide better service. One basic processing step is to merge the same user query keywords, which would reduce a large amount of memory or disk space occupied by data storage. In order to understand user demand and provide better and more convenient service, sampling analysis and investigation of user query keywords are taken during a period of time. Of course, the determined query keyword sample size is a small proportion for the total size of all user query keywords. If the processed page views are used directly for sampling analysis, the sample probability is much higher for those query keywords that appear with high query frequency and the sample probability is much lower for those query keywords with low query frequency. Consequently, the samples are somewhat skewed and the primary objective of sampling is not achieved. In addition, because net display space is limited, it is not possible to display query keywords of all users in real time. Instead, selective query keywords are displayed through sampling query keywords to set up small-scale mathematical model. To more accurately reflect user query demand, however, the sample user query keyword distribution is required to closely resemble to the distribution a massive number of user query keywords.

Figure 3:
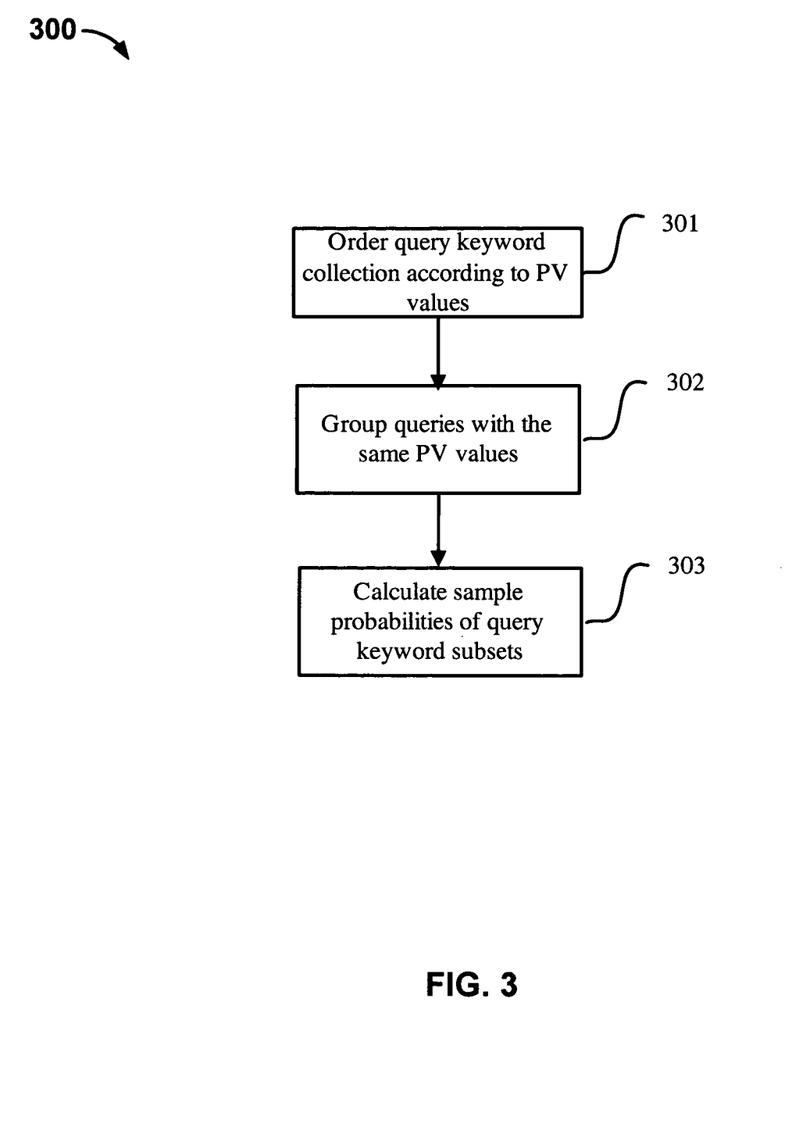
FIG. 3 is a flowchart illustrating an embodiment of a process for calculating sample rate of each query keyword subset.

FIG. 3 is a flowchart illustrating an embodiment of a process for calculating sample rate of each query keyword subset. In some embodiments, process 300 is used to implement 202 of process 200. In the example shown, process 300 initiates at 301, where entries in the search engine query keyword collection, saved in the format of "query keyword PV", are ordered according to their PV values. In various embodiments, the PV values may be ordered in descending order from large to small, or in ascending order from small to large. For example, suppose that in a period of time the total size of all user query keywords TPV value recorded by search engine is 100000, and there are 2000 records with query keyword "Alibaba" and saved in the format of "Alibaba 2000", 1800 records with query keyword "ecommerce" and saved in the format of "ecommerce 1800", 500 records with query keyword "computer" and saved in the format of "computer 500", 500 records with query keyword "clothes" and saved in the format of "clothes 500", . . . ; 60 records with query keyword "glass", 60 records with query keyword "pencil", 60 records with query keyword "notes" and so on and saved according to the storage format above. Then the query collection in ascending order is organized as: "glass 60", "pencil 60", "notes 60", . . . "computer 500", "clothes 500", "ecommerce 1800" and "Alibaba 2000", . . . .

At 302, query keywords with the same PV values are grouped. Query keywords with the same PV values are regarded as one subset of query keyword collection, QuerySet, and the queries belonging to it have the same PV value for each query keyword. Different QuerySets can be obtained according to different PV values. Supposing the PV values are from 1 to K, query keyword subsets QuerySet1, QuerySet2, . . . , QuerySetK are obtained. In some circumstances, for different user queries, PV values of each query keyword may not be continuous in a period of time. Query keywords with the same PV values are merged to get multiple query keyword subsets, such as QuerySet60, QuerySet500, QuerySet1800, QuerySet2000, and so on.

At 303, the sample probabilities of the query keyword subsets are calculated. For query keyword subset QuerySetI comprising queries with PV value of I, the total PV size of the query keyword subset, SPV, is obtained as: $SPV_i=I*|QuerySetI|$, where I stands for the PV value of I, |QuerySetI| stands for the size of the query keyword subset, that is, how many query keywords with a PV value of I belong to the subset. Take query keyword subset QuerySet60 as an example, supposing that there are 30 page views of "query keywords 60", then |QuerySet60| equals to 30, which indicates that there are 30 different queries in the query keyword subset and the SPV value is 60*30=1800. For data with long-tail distribution, the smaller the PV values, the more query keywords are included the query keyword subset. Thus, the SPV value as a statistic value is not affected by small PV values of individual query keywords. For example, for query data "glass 60", its PV value is small compared with the sum of queries TPV value 100000, or even with the PV value of "Alibaba 2000". But for the query keyword subset QuerySet60 that "glass 60" belongs to, its SPV value is 1800 and is close to the SPV value of the query keyword subset that "Alibaba 2000" belongs to (supposing that there is only one page view value in "Alibaba 2000").

In order to calculate the sample probability of each query keyword subset, the SPV values of all query keywords are summed and the total size of all query keywords is obtained. The total size of all query keywords is called TPV value. Given TPV value, sample probabilities of all query keyword subsets during the course of sampling can be calculated. For example, for the query keyword subset with the PV value i, its sample probability is $P_i=SPV_i/TPV$. The calculation is repeated in some embodiments until the sample probabilities of all query keyword subsets are obtained.

For many query keywords with low frequencies of appearance, the sample probabilities of the low-frequency queries are very small; however, for a query keyword subset with the same PV value, the number of low-frequency query keywords in the subset can be large, so the SPV size of query keyword subset comprising low-frequency query keywords can be large. Thus, these low-frequency query keywords are sampled as a whole and the sample probability is enlarged effectively, which makes the final sampled data is more consistent with the real distribution of data. Using the example above, the sample probability of query keyword subset QuerySet60, which includes 30 query keywords, is $P_{60}=1800/100000=0.018$; the sample probability of query keyword subset QuerySet2000, which has just 1 query keyword, is $P_{2000}=2000/100000=0.020$. So it can be seen from the data results obtained, the sample probabilities of query keyword subsets QuerySet60 and QuerySet2000 are very close.

Assuming a sample size of K, the sample query size from each query keyword subset can be calculated according to the sample probability of each collection. For example, supposing that K is determined to be 5000 and the sample probability of subset with PV=60 is 0.018. Thus, the query size to be sampled from QuerySet60 is 5000*0.018=90. Supposing that the sample probability of subset with PV=2 is 0.010, the query size to be sampled from QuerySet2 is therefore 5000*0.010=50.

Figure 4:
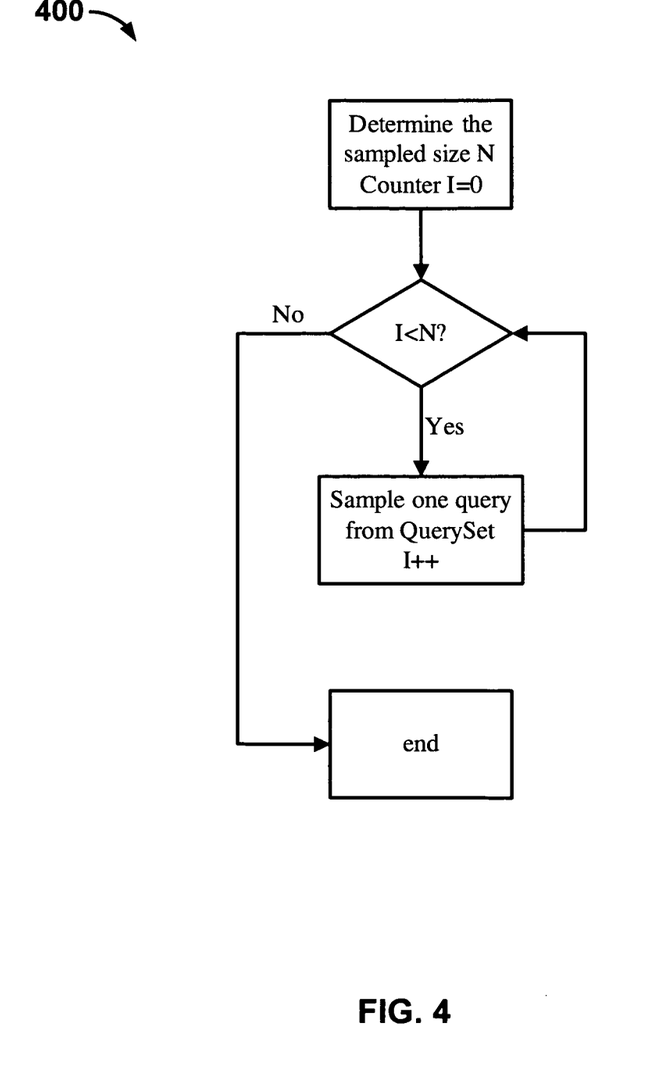
FIG. 4 is a flowchart illustrating an embodiment of a process for sampling the query keywords.

FIG. 4 is a flowchart illustrating an embodiment of a process for sampling the query keywords. Process 400 may be used to implement 203 of process 200. In this process, a query keyword is randomly sampled from some selected query keyword subset. At this point, the query size N (N is a natural number) sampled from a query keyword subset has already been determined. Thus, to sample queries, N samples are taken in the corresponding query keyword subset. Each time a page view is randomly selected from the query keyword subset, until the number of samples reaches N. For example, for query keyword subset QuerySet60, in Step 303, the query size sampled from the query keyword subset is 90 according to the sample probability of the query keyword subset. Therefore, in the final query keyword sampling, the query keyword subset is sampled 90 times to obtain 90 page views.

When sampling one arbitrary search engine page view from some query keyword subset, the query keywords with the same PV values are classified as one class. Therefore, for every query keyword in the query keyword subset, the probability of being sampled is the same. For example, when sampling in the query keyword subset QuerySet60, the sampled 90 page views maybe comprise 2 page views of "glass", 3 page views of "pencil", and so on. In this way, even when queries with low-frequencies of occurrences are sampled, the sampled results obtained are still close to the real distribution of data to achieve the primal purpose of sampling analysis.

Figure 5:
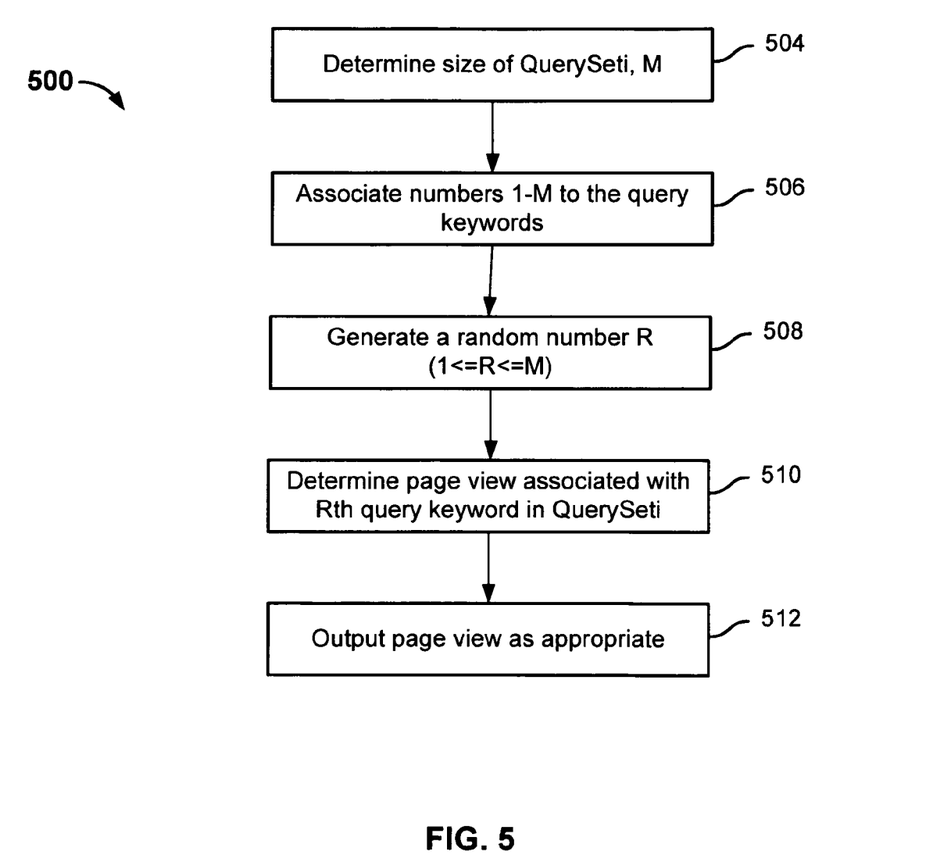
FIG. 5 is a flowchart illustrating an embodiment of a random sampling process.

In some embodiments, a random sampling process is used for sampling the query keyword. FIG. 5 is a flowchart illustrating an embodiment of a random sampling process. Process 500 may be used to implement 203 of process 200. For a particular QuerySet; (query keyword subset i), at 504, the size of QuerySet$_i$ (i.e., the number of query keywords in the subset) is determined. Assuming that there are M query keywords in the subset, at 506, the page views in QuerySet$_i$ are associated with numbers 1 to M. At 508, a random number, R, which has a random integer value between 1 and M, is generated. At 510, the page view associated with the R$^{th}$ query keyword in QuerySet$_i$ is determined. At 512, the value of the page view is output as appropriate, such as to another process or module that displays this information to system administrators. The process may be repeated to sample QuerySet$_i$ N times and to sample all query keyword subsets.

In the embodiment described above, a two-stage sampling analysis is taken, queries demanded are sampled from a preliminarily statistically processed search engine query keyword collection with a huge number of entries, and sampled results have distributions close to the distribution of real data. By using the sampling technique, preliminary statistic data are preserved and used to reduce storage needed by subsequent calculation, and the problem of underestimating low-frequency queries associated with previous techniques is alleviated. According to the information obtained by sampled data, search engine service providers can understand user demand and market trends more accurately, uncover business opportunities, adjust search engine service content in order to provide convenient and fast online ecommerce trade platform, and enhance service quality.

Figure 6:
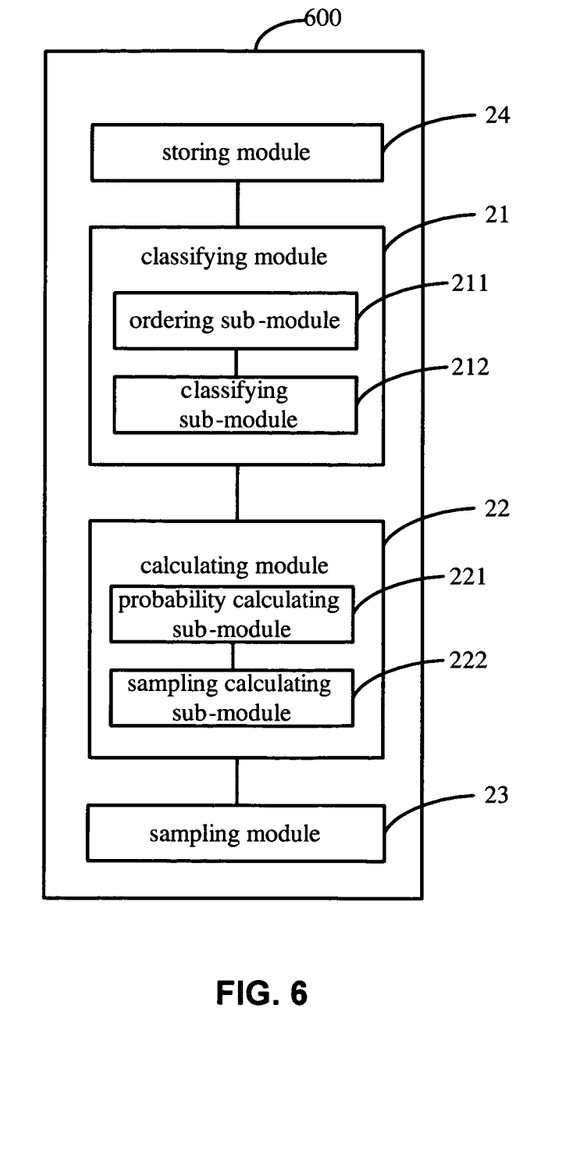
FIG. 6 is a block diagram illustrating an embodiment of a sampling analyzer.

FIG. 6 is a block diagram illustrating an embodiment of a sampling analyzer. Device 600 shown in this example includes classifying module 21, which is used for classifying query keywords into at least one query keyword subset according to PV values of different query keywords; calculating module 22, which is used for calculating sampled size of the query keyword subset divided by the classifying module 21; sampling module 23, which is used for sampling query data in the query keyword subset divided by the classifying module 21 according to the sampled size calculated by the calculating module 22. In some embodiments, the sampling analysis device further comprises: storing module 24, which is used for storing the PV values of different query keywords which are amounts of at least one query keyword appearing in a pre-set period of time.

In this example, the classifying module 21 further comprises: ordering sub-module 211, which is used for ordering the PV values of different query keywords stored by the storing module 24; classifying sub-module 212, which is used for classifying the query keywords with the same PV value as one query keyword subset according to the order ordered by the ordering sub-module 211.

In this example, the calculating module 22 further comprises: probability calculating sub-module 221, which is used for calculating sampled probability of the query keyword subset; sampling calculating sub-module 222, which is used for calculating sampled size of the query keyword subset according to determined query size sampled and the sampled probability calculated by calculating sub-module 221.

Query data demanded can be sampled from a large amount of preliminarily statistically processed query keyword collection, which can reduce the storage required for subsequent calculation and solve the risk of underestimating low-frequency queries, which achieves the goal of sampling page views, makes medium-scale or small-scale samples close to distribution of real data and provides exact user demand information and market trend to search engine service providers to increase quality.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The modules may be implemented on a single device or distributed across multiple devices. The functions of the modules may be merged into one another or further split into multiple sub-modules.

Through the description of the embodiments above, the technical personnel in this field can understand clearly that the present invention can be implemented by hardware or software and necessary current hardware platform. Based on this understanding, the technical program of the present invention can be embodied by a form of software products which can be stored in a nonvolatile storage medium (such as CD-ROM, U disk, mobile hard disk, etc.), including a number of instructions for making a computer device (such as personal computers, servers, or network equipments, etc.) implement the methods described in the embodiments of the present invention.

The descriptions above are just preferred implement ways of the present invention. It should be pointed that, for general technical personnel in this field, some improvement and decorating can be done, which should be as the protection scope of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for sampling analysis, comprising:
classifying, using a computer processor, a plurality of query keywords into a plurality of query keyword subsets according to page view (PV) values associated with the plurality of query keywords, the plurality of query keywords being submitted by a plurality of users, wherein classifying the plurality of query keywords comprises:
ordering the PV values associated with the plurality of query keywords; and
grouping, based on the ordered plurality of PV values, query keywords with the same PV value to form respective ones of the plurality of query keyword subsets, such that query keywords with the same PV value are found within the same query keyword subset;
determining a plurality of sample rates of corresponding ones of the plurality of query keyword subsets, wherein a given sample rate of the plurality of sample rates is determined by at least:

calculating a sum of page view values (SPV) in a corresponding query keyword subset;
calculating a sample probability by dividing the SPV in the corresponding query keyword subset by a total number of all user query keywords submitted by the plurality of users within a predetermined period of time; and
multiplying the sample probability by a predetermined sample size;
sampling query data in the plurality of query keyword subsets according to the respective ones of the plurality of sample rates, wherein the sampling includes sampling all of the plurality of query keyword subsets; and
outputting the sampled query data.

2. The method of claim 1, wherein sampling query data generates a sampled distribution of sampled query keywords that substantially resembles an actual distribution of the respective plurality of query keywords.

3. The method of claim 1, wherein the PV values correspond to numbers of appearances of the respective ones of the plurality of query keywords in a search platform in a pre-set period of time.

4. The method of claim 1, wherein the respective plurality of sample rates includes a respective plurality of sample sizes to be used during sampling of respective ones of the plurality of query keyword subsets.

5. The method of claim 4, wherein the respective plurality of sample sizes is determined by:
determining a respective plurality of sample probabilities associated with the respective one of the plurality of query keyword subsets;
determining the respective plurality of sample sizes according to a predetermined query keyword sample size and the respective plurality of sample probabilities.

6. The method of claim 5, wherein determining the respective plurality of sample probabilities includes:
determining a sum of PV values (SPV value) of the query keyword subset;
determining a total number of PV values in the plurality of query keyword subsets according to the SPV value;
determining a sample probability of the query keyword subset according to the SPV value and the TPV value.

7. The method of claim 1, wherein, random sampling is used for sampling query data in the query keyword subset according to the sampled size.

8. The method of claim 7, wherein, random sampling includes generating a random number and selecting a query keyword in the query keyword subset that is associated with the random number.

9. A sampling analysis system, comprising:
a processor configured to:
classify a plurality of query keywords into a plurality of query keyword subsets according to page view (PV) values associated with the plurality of query keywords, the plurality of query keywords being submitted by a plurality of users, wherein classifying the plurality of query keywords comprises:
ordering the PV values associated with the plurality of query keywords; and
grouping, based on the ordered plurality of PV values, query keywords with the same PV value to form respective ones of the plurality of query keyword subsets, such that query keywords with the same PV value are found within the same query keyword subset;
determine a plurality of sample rates of corresponding ones of the plurality of query keyword subsets, wherein a given sample rate of the plurality of sample rates is determined by at least:
calculating a sum of page view values (SPV) in a corresponding query keyword subset;
calculating a sample probability by dividing the SPV in the corresponding query keyword subset by a total number of all user query keywords submitted by the plurality of users within a predetermined period of time; and
multiplying the sample probability by a predetermined sample size;
sample query data in the plurality of query keyword subsets according to the respective ones of the plurality of sample rates, wherein the sampling includes sampling all sampling of the plurality of query keyword subsets;
output the sampled query data; and
a memory coupled to the processor, configure to provide the processor with instructions.

10. The system of claim 9, wherein the processor is configured to sample the query data to generate a sampled distribution of sampled query keywords that substantially resembles an actual distribution of the respective plurality of query keywords.

11. The system of claim 9, wherein the PV values correspond to numbers of appearances of the respective ones of the plurality of query keywords in a search platform in a pre-set period of time.

12. The system of claim 9, wherein the respective plurality of sample rates includes a respective plurality of sample sizes to be used during sampling of respective ones of the plurality of query keyword subsets.

13. The system of claim 12, wherein the respective plurality of sample sizes is determined by:
determining a respective plurality of sample probabilities associated with the respective one of the plurality of query keyword subsets;
determining the respective plurality of sample sizes according to a predetermined query keyword sample size and the respective plurality of sample probabilities.

14. The system of claim 13, wherein determining the respective plurality of sample probabilities includes:
determining a sum of PV values (SPV value) of the query keyword subset;
determining a total number of PV values in the plurality of query keyword subsets according to the SPV value;
determining a sample probability of the query keyword subset according to the SPV value and the TPV value.

15. The system of claim 9, wherein random sampling is used for sampling query data in the query keyword subset according to the sampled size.

16. The system of claim 15, wherein, random sampling includes generating a random number and selecting a query keyword in the query keyword subset that is associated with the random number.

17. A non-transitory computer readable storage medium for sampling analysis, the non-transitory computer readable storage medium storing computer instructions that cause a processor to perform the steps comprising:
classifying a plurality of query keywords into a plurality of query keyword subsets according to page view (PV) values associated with the plurality of query keywords, the plurality of query keywords being submitted by a plurality of users, wherein classifying the plurality of query keywords comprises:

ordering the PV values associated with the plurality of query keywords; and grouping, based on the ordered plurality of PV values, query keywords with the same PV value to form respective ones of the plurality of query keyword subsets, such that query keywords with the same PV value are found within the same query keyword subset;

determining a plurality of sample rates of corresponding ones of the plurality of query keyword subsets, wherein a given sample rate of the plurality of sample rates is determined by at least:

calculating a sum of page view values (SPV) in a corresponding query keyword subset;

calculating a sample probability by dividing the SPV in the corresponding query keyword subset by a total number of all user query keywords submitted by the plurality of users within a predetermined period of time; and multiplying the sample probability by a predetermined sample size;

sampling query data in the plurality of query keyword subsets according to the respective ones of the plurality of sample rates, wherein the sampling includes sampling of all of the plurality of query keyword subsets; and outputting the sampled query data.

\* \* \* \* \*